United States Patent [19]
Bird

[11] Patent Number: 5,579,856
[45] Date of Patent: Dec. 3, 1996

[54] GAGE SURFACE AND METHOD FOR MILLED TOOTH CUTTING STRUCTURE

[75] Inventor: Jay S. Bird, Waxahachie, Tex.

[73] Assignee: Dresser Industries, Inc., Dallas, Tex.

[21] Appl. No.: 465,084

[22] Filed: Jun. 5, 1995

[51] Int. Cl.⁶ .............................. E21B 10/16; E21B 10/50
[52] U.S. Cl. .................... 175/375; 76/108.4; 76/DIG. 11
[58] Field of Search .................................. 175/374, 375, 175/425, 435; 76/108.2, 108.4, 108.1, DIG. 11; 51/295

[56] References Cited

U.S. PATENT DOCUMENTS

| | | | |
|---|---|---|---|
| 2,660,405 | 11/1953 | Scott et al. | 175/375 |
| 2,887,302 | 5/1959 | Garner | 175/374 |
| 2,907,551 | 10/1959 | Peter | 175/375 |
| 2,939,684 | 6/1960 | Payne | 175/375 |
| 3,003,370 | 10/1961 | Coulter, Jr. | 76/108.1 X |
| 3,091,300 | 5/1963 | Hammer | 175/333 |
| 3,800,891 | 4/1974 | White et al. | 175/374 |
| 4,262,761 | 4/1981 | Crow | 175/374 |
| 4,562,892 | 1/1986 | Ecer | 175/425 |
| 4,593,776 | 6/1986 | Salesky et al. | 175/375 |
| 4,726,432 | 2/1988 | Scott et al. | 175/375 |
| 4,836,307 | 6/1989 | Keshavan et al. | 175/374 |
| 4,938,991 | 7/1990 | Bird | 427/190 |
| 5,131,480 | 7/1992 | Lockstedt et al. | 175/374 |
| 5,152,194 | 10/1992 | Keshavan et al. | 76/108.2 |
| 5,351,771 | 10/1994 | Zahradnik | 175/374 |

Primary Examiner—Stephen J. Novosad
Attorney, Agent, or Firm—Baker & Botts, L.L.P.

[57] ABSTRACT

A milled tooth (22) is provided having a back face (38), including an upper back face surface (58) and a lower back face surface (60). A tip or top surface (36) is provided below the upper back face surface (58). The upper back face surface (58) is in a recessed position relative to the lower back face surface (60). A gage rib guide (64) runs along one side of the lower back face surface (60). A layer of hardfacing material (33) is applied to the milled tooth (22) so that the layer (72) applied to the lower back face (60) surface is flush with the gage rib guide (64) and the layer (74) of hardfacing material (33) is thickest in the region of the upper back face surface (58).

21 Claims, 4 Drawing Sheets

GAGE SURFACE AND METHOD FOR MILLED TOOTH CUTTING STRUCTURE

TECHNICAL FIELD OF THE INVENTION

The present invention relates in general to the art of earth boring and, more particularly, to an improved cutting structure for a milled tooth rotary cone drill bit.

BACKGROUND OF THE INVENTION

A type of rotary drill bit used for drilling earth boreholes for the exploration and production of oil and gas and the like is commonly known as a rotary cone drill bit. This type of bit employs a multiplicity of rolling cone cutters, also known as rotary cone cutters, rotatably mounted on bearing pins extending from the arms of the bit. The cutters are mounted on pins that extend downwardly and inwardly with respect to the bit axis so that the conical sides of the cutters tend to roll on the bottom of the borehole and contact the formation. The rows of milled teeth on each cutter are often located in offset relation to the corresponding rows on the other cutters and drill separate tracks at the bottom of the borehole. The milled teeth tend to wear in those areas that engage the bottom and peripheral wall of the borehole during the drilling operation.

The service life of the tooth cutting structure may be improved by the addition of tungsten carbide particles to certain wear areas of the milled teeth. This operation is known as "hardfacing." U.S. Pat. No. 4,262,761, issued Apr. 21, 1981, discloses the application of hardfacing material to a milled tooth, and is hereby incorporated by reference in its entirety. The hardfacing may be designed to create a wear or erosion pattern to produce a self-sharpening tooth profile.

The severe use that drill bits encounter results in the components of the drill bit being repeatedly subjected to much higher stresses, with respect to the ultimate strength of the material, than are commonly encountered in other types of machines. Further, the bits must function profitably in different earth formations, and the geometry of the bit must provide a well balanced cutting structure. The efficient use of available space is also extremely important. The relationship between the cutters is such that a change in the shape or size of any one cutter affects the other cutters. The determination of cone shape or cone contour is also critical.

SUMMARY OF THE INVENTION

In accordance with the present invention, the disadvantages and problems associated with previous rolling cone milled tooth cutting structures have been substantially reduced or eliminated. One aspect of the present invention includes a tooth cutting structure able to better withstand the stresses encountered as a result of the repeated use of the cutting structure within a harsh environment. A second aspect of the invention is the provision of a gage rib guide able to assist in the application of a proper amount of hardfacing material to selected portions of the tooth cutting structure.

A milled tooth of the present invention includes a top surface or tip, a base or heel, two opposing sides extending between the top surface and the base, a front surface between the sides, and back surface opposite the front surface. The back surface has an upper portion and a lower portion. The upper portion of the back surface is disposed in a recessed position relative to the lower portion of the back surface. A gage rib guide runs along one side of the lower portion of the back surface.

A layer of hardfacing material may be applied in accordance with the teachings of the present invention to the milled tooth so that the layer of hardfacing material applied to the back surface is substantially flush with the gage rib guide. The layer of hardfacing material is thickest in the area of the upper portion of the back surface as a result of the upper portion being recessed relative to the lower portion.

For each milled tooth, the use of a recessed region with a thicker layer of hardfacing material in the region of the leading edge of the milled tooth extends the effective life of the milled tooth and the associated drill bit. The edge formed by the top surface and the upper portion of the back surface is the leading edge of the milled tooth. It is this leading edge of each of the milled teeth that contacts the bottom and sides of the borehole during drilling operations. An added layer of hardfacing protects this region from premature decay or erosion. The added layer of hardfacing material extends the life of the milled tooth and prevents premature wear of the milled tooth and the other components of the drill bit or drill string.

In addition, the gage rib guide provides a means of determining the proper amount of hardfacing material to be applied to the milled tooth so that a similar thickness of hardfacing material is applied to each milled tooth. When each of the milled teeth has a similar thickness of applied hardfacing material, the borehole is drilled at a predictable diameter and stresses are spread over each of the milled teeth engaged in drilling. The teachings of the present invention also aid in the reduction of manufacturing costs, as the gage rib guide eliminates the excess application of hardfacing material to each of the milled teeth.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiments of the present invention and its advantages are best understood by referring to FIGS. 1–7 of the drawings, like numerals being used for like and corresponding parts of the various drawings.

Figure 1:
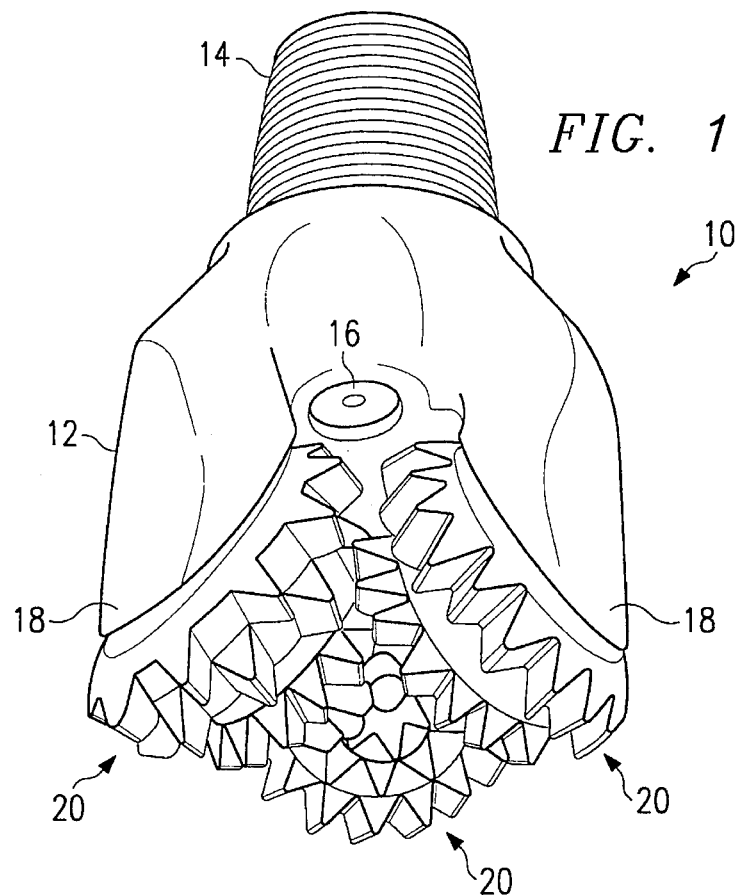
FIG. 1 is an isometric drawing showing a rotary cone drill bit constructed according to the present invention.

A milled tooth rotary cone drill bit, indicated generally at 10, is shown in FIG. 1. Drill bit 10 includes a bit body 12 adapted to be connected at its pin or threaded connection 14 to the lower end of a rotary drill string (not shown). Threaded connection 14 and the corresponding threaded connection of the drill string are designed to allow for rotation of drill bit 10 in response to rotation of the drill string at the well surface (not shown). Bit body 12 includes a passage (not shown) that provides downward communication for drilling mud or the like passing downwardly through the drill string. The drilling mud exits through nozzle 16 and is directed to the bottom of the borehole and then passes upward in the annulus between the wall of the borehole and the drill string, carrying cuttings and drilling debris therewith.

Depending from bit body 12 are three substantially identical arms 18. The lower end portion of each of the arms 18 is provided with a bearing pin or spindle 34. Each arm 18 rotatably supports a generally conical cutter cone assembly 20. Each cutter cone assembly 20 has a defined axis of rotation about which the cutter cone assembly rotates.

Figure 2:
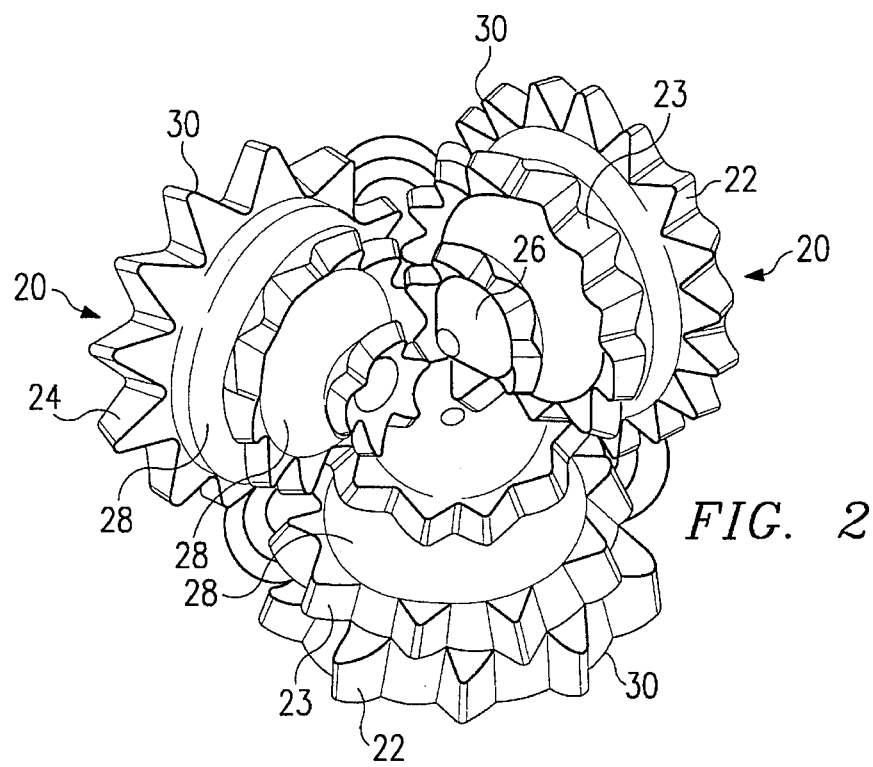
FIG. 2 is a bottom plan view of the drill bit of FIG. 1.

Referring now to FIG. 2, a bottom plan view of the bit 10 is shown. Milled teeth 23 are formed on each cutter cone assembly 20 in rows 24 along the tapered surface of each of the respective cones. The row closest to the support arm 18 of each cutter cone assembly 20 is known as the back row, or gage row 30. The milled teeth in the gage row 30 are known as the gage row milled teeth 22. Each gage row milled tooth 22 of gage row 30 is generally of the same size, or gage. Additionally, cutter cone assembly 20 includes a nose 26. Milled teeth 23 of one cutter cone assembly 20 are formed to interfit with milled teeth 23 of each of the opposite cutter cone assemblies 20. The milled teeth of one cutter cone assembly 20 are formed in rows 24 at a slightly different distance from nose 26 as compared with the other cutter cone assemblies 20, allowing the milled teeth 23 of one cutter cone assembly 20 to lie within the trough or groove 28 formed between the milled teeth 23 of the adjacent cutter cone assemblies 20.

Cutter cone assemblies 20 may sometimes be referred to as "rotary cone cutters" or "roller cone cutters." The cutting action or drilling action of drill bit 10 occurs as cutter cone assemblies 20 are rolled around the bottom of the borehole by the rotation of the drill string. The resulting inside diameter of the borehole corresponds approximately with the combined outside diameter, or gage diameter, of cutter cone assemblies 20.

Figure 3:
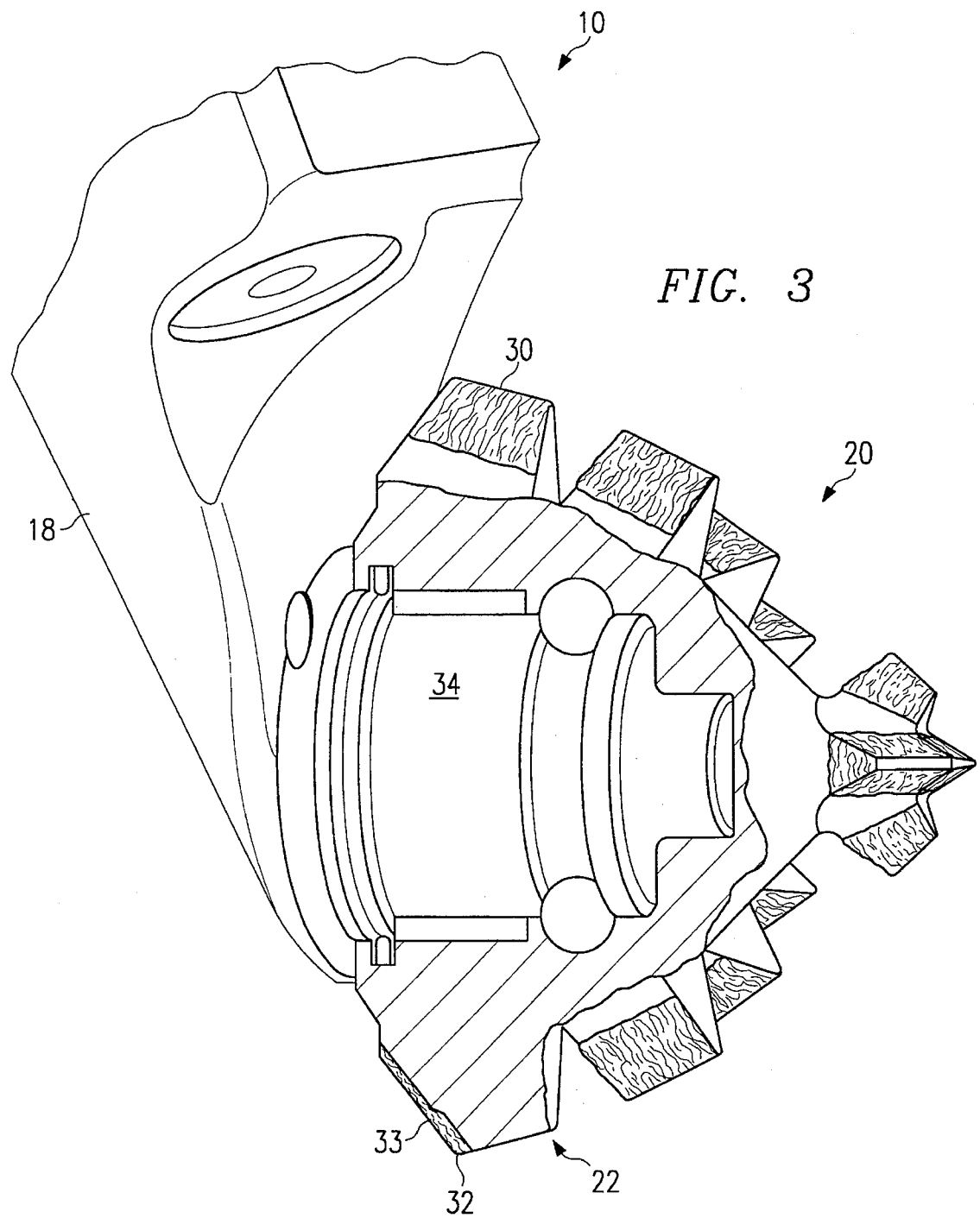
FIG. 3 is an enlarged drawing partially in section with portions broken away showing the interconnection of a support arm and cutter cone assembly of the present invention having milled teeth constructed according to the present invention.

FIG. 3 is a sectional view of the interconnection of one cutter cone assembly 20 and its associated support arm 18. Each of the arms 18 has a spindle 34 attached to the end of arm 18 opposite bit body 12. Cutter cone assembly 20 is mounted on spindle 34. Also shown in FIG. 3 is a sectional view of gage row milled tooth 22 in gage row 30 of cutter cone assembly 20. As drill bit 10 rotates, successive gage row milled teeth 22 in gage row 30 in each of cutter cone assemblies 20 cut the outer diameter of the borehole. The primary cutting action of each of the gage row milled teeth 22 of gage row 30 occurs at the leading edge 32 of each of gage row milled tooth 22. A layer of hardfacing material 33 is applied in accordance with the teachings of the present invention to each of gage row milled teeth 22 of gage row 30.

Figure 4:
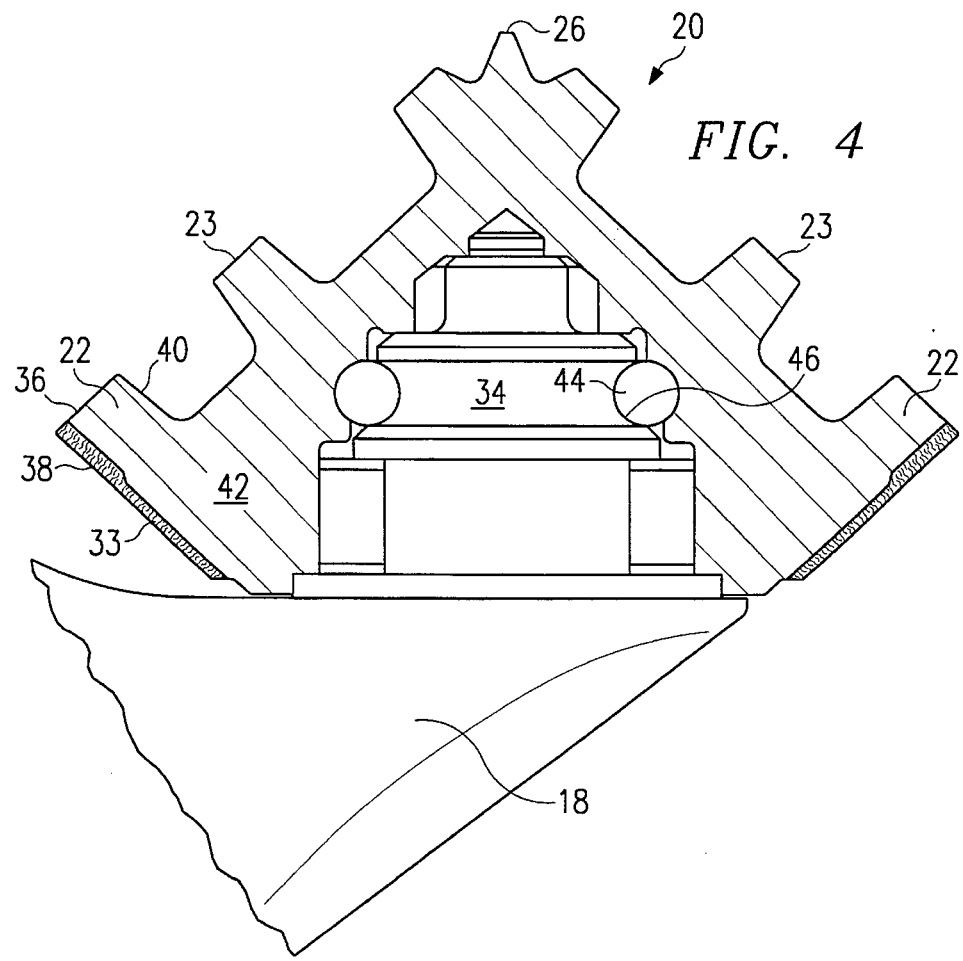
FIG. 4 is a side view partially in section and partially in elevation with portions broken away of the cutter cone assembly of the present invention.

FIG. 4 is a sectional view of the interconnection of support arm 18 and cutter cone assembly 20. Each of gage row milled teeth 22 has a tip 36, a back face or gage surface 38, a front face 40, and a base 42. Back face or gage surface 38 is labeled as such because back face 38 is the surface of the tooth cutting structure closest to the rear or back of cutter cone assembly 20.

A layer of hardfacing material 33 is shown on back face 38 of gage row milled teeth 22 in gage row 30. Cutter cone assembly 20 is retained on spindle 34 by a conventional ball retaining system comprising a plurality of ball bearings 44 aligned in a ball race 46.

Figure 5:
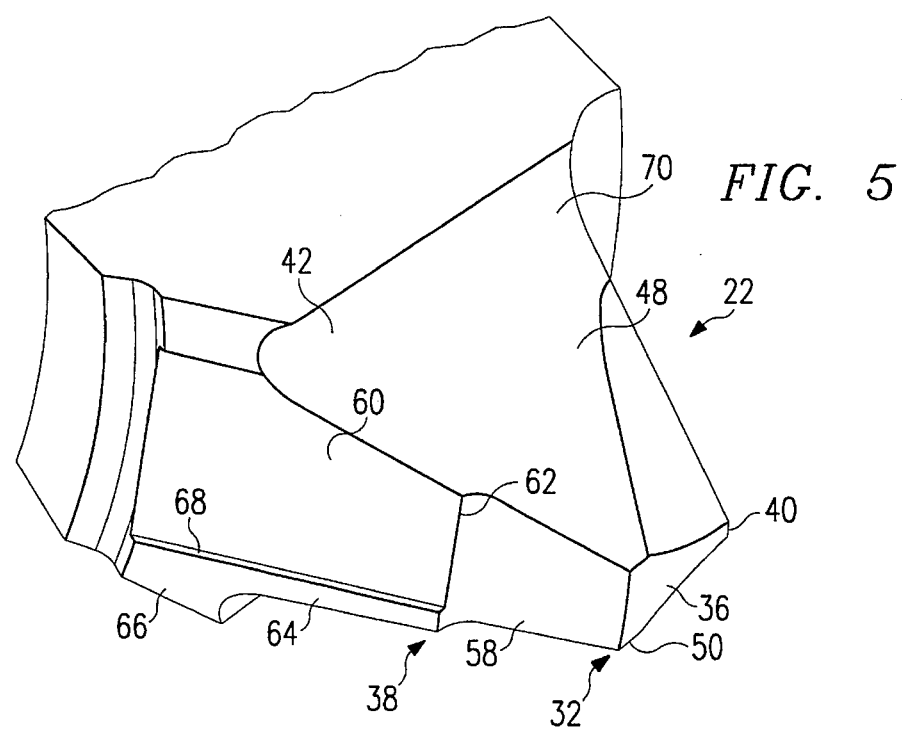
FIG. 5 is an isometric drawing showing a milled tooth constructed according to the present invention prior to the application of hardfacing material.

FIG. 5 shows the configuration of gage row milled tooth 22 constructed according to the present invention. Gage row milled tooth 22 of FIG. 5 is only one of several milled teeth located on gage row 30 of each cutter cone assembly 20. Each gage row milled tooth 22 has a top surface or tip 36, and a front face 40. Tip 36 may be flat. Each of the gage row milled teeth 22 has two opposing sides comprising a leading surface or leading flank surface 48 in the direction of rotation and a trailing surface or trailing flank surface 50 opposite the direction of rotation. Each of gage row milled teeth 22 has a base 42. A channel 70 separates each gage row milled tooth 22 from the adjacent gage row milled tooth 22.

Back face or gage surface 38 comprises an upper back face surface 58, a lower back face surface 60, with an edge 62 between the two surfaces. Back face 38 includes a gage rib guide 64 adjacent lower back face surface 60. Upper back face surface 58 is in a recessed position with respect to lower back face surface 60. In one embodiment of the present invention, upper back face surface 58 lies in a plane substantially parallel and may be 0.020–0.100 inches recessed from lower back face surface 60. Gage rib guide 64 includes a rear surface 66, and a guide surface 68 connecting rear surface 66 to lower back face surface 60 of back face 38. Guide surface 68 may be perpendicular to rear surface 66.

Figure 6:
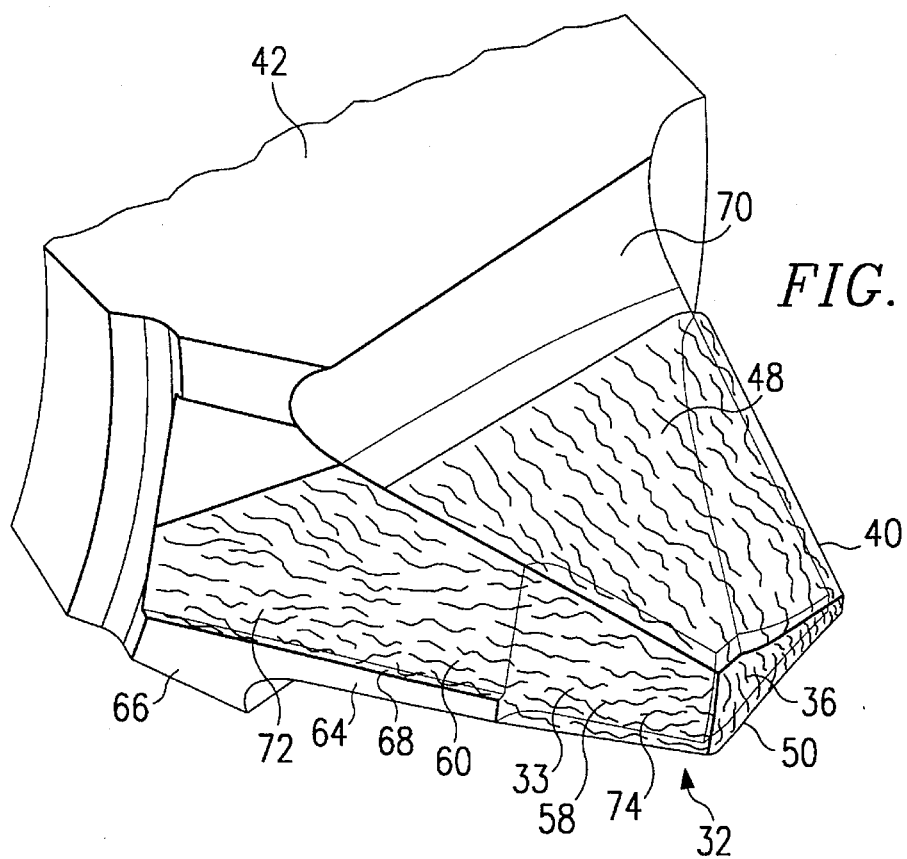
FIG. 6 is an isometric drawing showing the application of a layer of hardfacing material to the milled tooth of FIG. 5.
Figure 7:
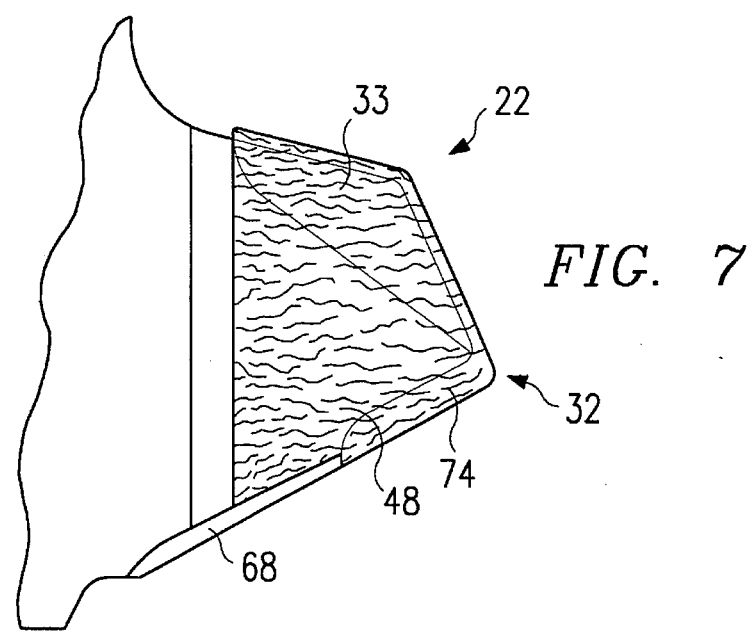
FIG. 7 is a side view of the milled tooth of FIG. 6.

As shown in FIGS. 6 and 7, a hardfacing material 33 is welded to tip 36, front face 40, leading flank surface 48, trailing flank surface 50, upper back face surface 58, and lower back face surface 60 of each gage row milled tooth 22. Hardfacing material 33 is commonly formed of a mixture of tungsten carbide particles and steel and is manually welded to each gage row milled tooth 22. Hardfacing material is not welded to rear surface 66 of gage rib guide 64. Hardfacing material 33 applied to lower back face surface 60 is of the same depth as guide surface 68 of gage rib guide 64 so that the surface of the layer 72 of hardfacing material 33 added to back face 38 is substantially flush with rear surface 66 of gage rib guide 64. Hardfacing layer 72 has a preferred thickness of approximately 0.100 inches, but this thickness can vary between 0.015 and 0.150 inches.

Additionally, as shown in FIGS. 6 and 7, when the surface of layer 72 of hardfacing material 33 added to the lower back face surface 60 is substantially flush with rear surface 66 of gage rib guide 64, the layer 74 of hardfacing material 33 applied to upper back face surface 58 is substantially thicker than layer 72 of hardfacing material 33 applied to lower back face surface 60. The addition of an added layer 74 of hardfacing material 33 to upper back face surface 58 provides an additional measure of protection to leading edge 32 of gage row milled tooth 22. Hardfacing layer 74 applied to upper back face surface 58 has a preferred thickness of 0.020 to 0.100 inches thicker than hardfacing layer 72 applied to lower back face surface 60. The preferred thickness of hardfacing layer 74 is therefore in the range of 0.035 to 0.250 inches.

On the other surfaces of gage row milled tooth 22, such as top surface 36, leading flank surface 48, and trailing flank surface 50, hardfacing material 33 is applied at substantially the same thickness as applied to the lower back face surface 60.

The extra thickness of hardfacing material applied to upper back face surface 58, which is disposed in a recessed position relative to lower back face surface 60, protects leading edge 32 against the harsh stresses received during rotation of rotary cone assemblies 20 during drilling of the borehole. Additionally, the extra thickness of hardfacing material 33 applied to upper back face surface 58 protects against a condition known as gage rounding or undergage, which occurs as gage row milled teeth 22 become worn at their respective leading edges 32, causing the drill bit to drill a borehole of an insufficient diameter, which in turn results in even greater stresses applied to the gage row 30, and the drill bit as a whole.

Gage rib guide 64 provides a reference for a welder so that the desired amount of hardfacing material 33 can be applied to each of the gage row milled teeth 22. Without gage rib guide 64, a welder assigned the task of applying hardfacing material 33 to each of the gage row milled teeth 22 may inadvertently apply more or less hardfacing material to an individual gage row milled tooth 22. By the elimination of an excess application of hardmetal facing 33 to the gage row milled teeth 22, the costs of hardmetal facing is minimized, and manufacturing costs are reduced.

Gage row milled tooth 22 of the present invention has an advantageous design allowing for the application of an added layer of hardfacing material 33 in the region where the gage row milled tooth 22 experiences the greatest stresses during operation. In addition, the use of gage rib guide 64 allows for the application of a uniform layer of hardfacing material 33 having the optimum thickness for each gage row milled tooth 22 to facilitate the drilling of a borehole having a predictable gage diameter. Uniform application of hardfacing material also results in more uniform wear of each gage row milled tooth 22 and extends the downhole drilling time for drill bit 10.

Although the present invention and its advantages have been described in detail, it should be understood that various changes, substitutions, and alterations can be made therein without departing from the spirit and scope of the invention as defined by the appended claims.

What is claimed is:

1. A rotary cone drill bit having at least one row of milled teeth with each tooth comprising:
   a tip;
   a base;
   two opposing side surfaces extending from said tip to said base;
   a front surface intermediate said side surfaces and extending from said tip to said base;
   a back surface intermediate said side surfaces and opposite said front surface, comprising:
     an upper back face surface extending from said tip;
     a lower back face surface intermediate said upper back face surface and said base, said upper back face surface disposed in a recessed position relative to said lower back face surface; and
     a gage rib guide running vertically along one side of said lower back face surface; and
   a layer of hardfacing material applied on said tip, side surfaces, front surface, upper back surface, and lower back face surface such that said lower hardface surface is flush with said gage rib guide and said layer of hardfacing material is thickest in said region of said upper back face surface.

2. The rotary cone milled tooth of claim 1, wherein said gage rib guide comprises:
   a rear surface substantially parallel to said lower back face surface; and
   a guide surface connecting said rear surface and said lower back face surface.

3. The rotary cone milled tooth of claim 1, wherein said layer of hardfacing material applied to said lower back face surface has a thickness in the range of 0.015 to 0.150 inches.

4. The rotary cone milled tooth of claim 1, wherein said layer of hardfacing material applied to said upper back face surface is 0.020 to 0.100 of an inch thicker than said layer of hardfacing material applied to said lower back face surface.

5. The rotary cone milled tooth of claim 1, wherein said guide surface of said gage rib guide has a depth of approximately 0.100 inches.

6. The rotary cone milled tooth of claim 1, wherein said upper back face surface is substantially parallel to said lower back face surface.

7. The rotary cone milled tooth of claim 1, wherein the interconnection of said tip and each of said front surface, side surfaces, and upper back face surface forms a sharp edge.

8. The rotary cone milled tooth of claim 1, wherein said tip is substantially flat.

9. The rotary cone milled tooth of claim 1, wherein said front surface comprises:
   a leading flank surface connected to one of said side surfaces; and
   a trailing flank surface connected to the other of said side surfaces.

10. A milled tooth for a rotary cone drill bit, comprising:
    a base;
    a top surface;
    a leading flank surface extending from said top surface to said base;
    a trailing flank surface opposite said leading flank surface and extending from said top surface to said base;
    a front surface intermediate said leading flank surface and said trailing flank surface and extending from said top surface to said base;
    an upper back face surface intermediate said leading flank surface and said trailing flank surface and extending from said top surface;
    a lower back face surface intermediate said leading flank surface and said trailing flank surface and extending from said upper back face surface to said base, said upper back face surface disposed in a recessed position relative to said lower back face surface;
    a gage rib guide having a rear surface intermediate said leading flank surface and said lower back face surface and extending along one side of said of said lower back face surface; and
    a layer of hardfacing material applied to the milled tooth such that the layer of hardfacing material applied to the lower back face surface is flush with the rear surface of the gage rib guide and the layer of hardfacing material is thickest in the area of the upper back face surface.

11. The milled tooth of claim 10, wherein said rear surface of said gage rib guide is substantially parallel to said lower back face surface; and
    wherein said gage rib guide further comprises a guide surface connecting said rear surface and said lower back face surface.

12. The milled tooth of claim 10, wherein said guide surface of said gage rib guide has a depth of between and 0.015 and 0.150 inches.

13. The milled tooth of claim 10, wherein said layer of hardfacing material applied to said upper back face surface has a thickness of 0.035 to 0.250 inches.

14. The milled tooth of claim 10, comprising:

said upper back face surface substantially parallel to said lower back face surface; and said interconnection of said top surface, and each of said leading flank surface, trailing flank surface, front surface, and upper back face surface forming a sharp edge.

15. The milled tooth of claim 10, wherein said front surface comprises:

a leading flank surface connected to one of said side surfaces; and a trailing flank surface connected to the other of said side surfaces.

16. A method for fabricating a milled tooth for a rotary cone drill bit comprising the steps of:

forming a base;

forming a tip;

forming two opposing side surfaces extending from said top surface to said base;

forming a front surface connected between said side surfaces and extending from said top surface to said base;

forming a lower back surface extending from said base in the direction of said top surface;

forming an upper back surface extending from said lower back face surface to said top surface, said upper back surface disposed in a recessed position relative to said lower back surface;

forming a gage rib guide running along one side of said lower back surface and between said lower back surface and one of said opposing side surfaces, said gage rib guide having a rear surface connected to one of said opposing side surfaces; and applying a layer of hardfacing material to the milled tooth so that the surface of the hardfacing material applied to the lower back surface is substantially flush with the rear surface of the gage rib guide and so that the layer of hardfacing material applied to the milled tooth is thickest in the area of the upper back surface.

17. The method for fabricating a milled tooth at claim 16, wherein the step of applying a layer of hardfacing material comprises the application of said layer of hardfacing material to said lower back face surface at a thickness of 0.015 to 0.150 inches.

18. The method for fabricating a milled tooth of claim 16, wherein the step of applying a layer of hardfacing material comprises the application of said layer of hardfacing material to said upper back face surface at a thickness of 0.035 to 0.250 of an inch.

19. The method for fabricating a milled tooth of claim 16, wherein the step of forming a front surface comprises:

forming a leading flank surface connected to one of said side surfaces; and forming a trailing flank surface connected to the other of said side surfaces.

20. The method for fabricating a milled tooth of claim 16 wherein said upper back surface is formed substantially parallel to said lower back surface.

21. The method for fabricating a milled tooth of claim 16, wherein sharp edges are formed at the interconnections of said tip and each of said side surfaces, front surfaces, and upper back surface; and wherein said tip is substantially flat.

* * * * *